Dec. 22, 1959     C. AUBIN     2,917,879
AUTOMATIC MACHINE FOR PACKING LIQUID OR OTHER PRODUCTS
Filed July 31, 1957     5 Sheets-Sheet 1

INVENTOR:
CLAUDE AUBIN
BY
Richardson, David and Nerdon
ATTYS.

Dec. 22, 1959 C. AUBIN 2,917,879
AUTOMATIC MACHINE FOR PACKING LIQUID OR OTHER PRODUCTS
Filed July 31, 1957 5 Sheets-Sheet 2

INVENTOR:
CLAUDE AUBIN
By
Richardson, David and Vardon
ATTYS.

Dec. 22, 1959 C. AUBIN 2,917,879
AUTOMATIC MACHINE FOR PACKING LIQUID OR OTHER PRODUCTS
Filed July 31, 1957 5 Sheets-Sheet 3

INVENTOR:
CLAUDE AUBIN
By
Richardson, David and Nordon
ATTYS.

Fig. 10

Fig. 11

United States Patent Office 2,917,879
Patented Dec. 22, 1959

2,917,879

AUTOMATIC MACHINE FOR PACKING LIQUID OR OTHER PRODUCTS

Claude Aubin, Paris, France, assignor to Societe d'Etude et d'Application Industrielle de Brevets (S.E.a.B.), Paris, France, a corporation of France Application July 31, 1957, Serial No. 675,352

Claims priority, application France August 10, 1956

10 Claims. (Cl. 53—77)

The present invention relates to the automatic packing of liquid, pasty or even powdered products (hygienic products, food products, etc.) in the form of doses, each of which is constituted of a certain quantity of a product or mixture of products hermetically sealed in a bag composed of two walls of plastic material which are jointed together by welding.

The object of the invention is to provide an entirely automatic machine for such packing in the form of bags, the successive doses of the product or products to be packed being hermetically sealed between two bands or walls of plastic material which pass through the machine in a continuous manner, said two bands or walls constituting either two separate bands having the width of the bag to be formed or two halves of a single band having a double width folded onto itself along its longitudinal centre line in the known manner.

This machine, which is simple in construction and has a very high output, comprises in combination: a feed device for continuously feeding the two bands on both sides of a longitudinal axial supply tube supplying the product to be packed, a first welding press for joining said two bands together on either side of said tube and thus form therearound at least one pocket, the successive pockets formed intercommunicating on the axis of said band, a second press for sealing the filled pockets along transverse welding lines, a pulling clamp to which is imparted opening and closing movements and an alternating longitudinal movement parallel with said bands for feeding the latter intermittently a distance corresponding to the length welded by said first press in the course of one of its closures, and devices for actuating in synchronism said presses and said clamp whereby said clamp pulls on said bands when the presses are open.

Further features and advantages of the invention will be apparent from the ensuing description with reference to the accompanying drawings, to which the invention is in no way limited.

Figures 1, 2:
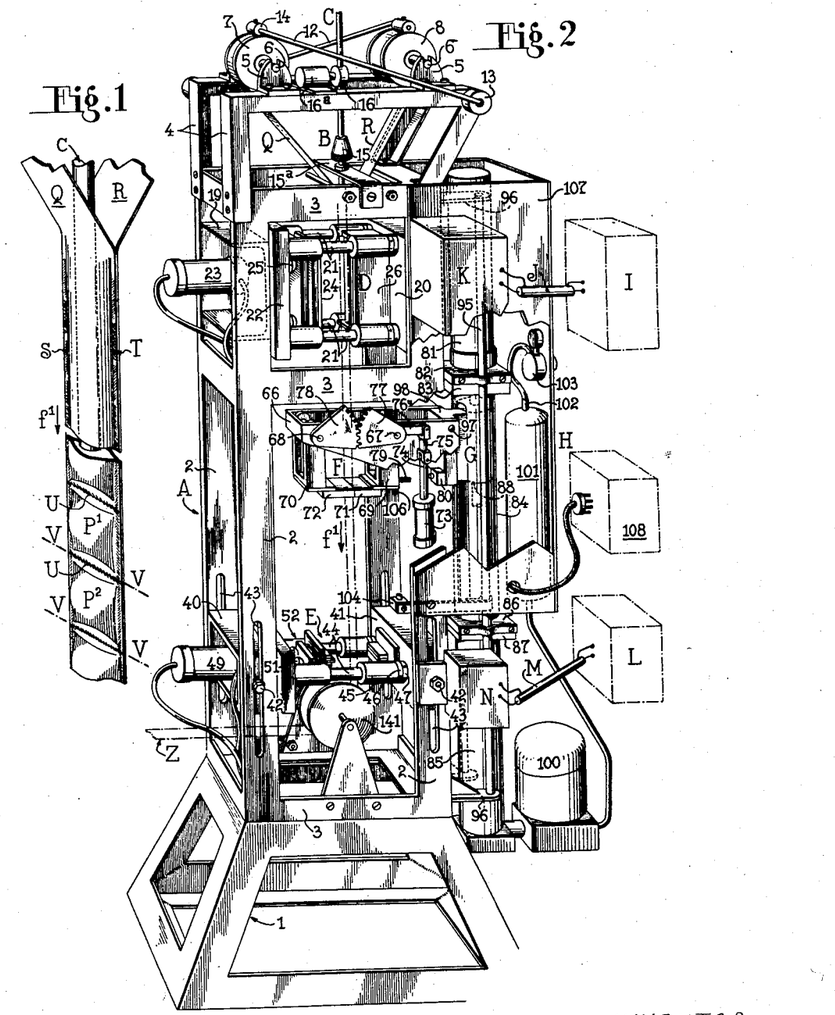
Fig. 1 is a diagrammatic perspective view of the packed product obtained with the machine embodying the invention, the packing or container being in the course of formation.
Fig. 2 is a perspective view, with parts cut away, of said machine.

Fig. 1 shows, in its various stages of formation, the packet obtained from the machine embodying the invention. It concerns, as mentioned hereinbefore, the manufacture of doses in the form of small flat-shaped bags $P^1$, $P^2$ . . . obtained from two bands Q and R of plastic material such as vinyl or polyvinyl chloride, polythene, superpolyamide, etc. If desired, these bands may be of composite type. They may be independent or constitute two halves of a larger band.

According to the invention, the bands Q and R are first joined together by two longitudinal welds S and T and the liquid, pasty or powdered filling product is poured between the joined portions of these bands, the annular space formed by these welds S and T around the product supply tube being closed at its base by the last bag formed.

Each bag is closed transversely thereof by two transverse welds U each weld, effected after filling, being common to two bags. The latter are subsequently separated from one another by cutting along lines V—V each of which is situated on the axis of a transverse weld U. The machine of the invention permits effecting the various aforementioned operations, the packed product moving vertically downwardly in the direction of arrow $f^1$ (Figs. 1 and 2).

To simplify the description, it has been assumed that the longitudinal welds S and T are rectilinear and formed along the edges of the bands Q and R, but, if desired, these welds could have, when viewed in elevation, any other shape depending on the shape desired for the bags; these welds in any case form a central passageway which the transverse welds U subsequently close.

I. Description of the machine (Fig. 2)

This machine comprises a stand A to the upper part of which is fixed a feed device B adapted to feed two bands Q and R in the downward direction and on either side of a tube C supplying the product to be packed.

Disposed under the supply device B is a first press D having two electrodes fed with high-frequency current and adapted to join together the two bands Q and R by forming two longitudinal welds S and T.

A second press E, also having two electrodes, is disposed at the lower part of the stand A for effecting the transverse welds U.

Between the two presses, a clamp F is supported by a liquid-air device G which imparts thereto vertical alternating movements. This clamp is adapted to feed the packed product downwardly a distance equal to the length of one of the bags to be obtained.

The unit is completed by electromagnetic control and supply devices H.

The machine operates in the following manner:

The bands Q and R fed by the feed device B are welded at S and T (Fig. 1) by the press D which forms a central passageway, into which the product to be packed flows from or is injected under pressure by the tube C.

The clamp F is moved downwardly a distance equal to the length of a container or bag during the period during which the two presses D and E are open.

The clamp F rises in the open condition during the welding period.

The lower press E is synchronized with the press D and closes the container by welding (transverse welds U) and prepares the separation of the bag in creating transverse lines of reduced resistance along the lines V—V (Fig. 1).

3

The various parts of this machine will now be described in detail.

(a) *Stand A* (*Fig. 2*).—It comprises a base 1, four parallel vertical uprights 2 which are interconnected by cross-members 3 which render the stand rigid.

(b) *Feed device B* (*Figs. 2 and 3*).—Fixed to the upper part of the stand A is a support 4 carrying bearings 5 in which are supported spindles 6 of two supply reels 7 and 8. These bearings are open so as to permit a rapid upward displacement of the reels for loading. Each reel 7 or 8 is held coaxial with its spindle 6 (Fig. 3) by two conical members 9. The lateral displacement of the conical members along this spindle and the lateral displacement of the latter in the bearings 5 is limited by collars 10 held in position by screws 11. The unwinding of the bands Q and R is braked by two brakes, each of which is composed by a curved rod 12 pivotably mounted on a pivot 13 rigid with the support 4. A sleeve 14 is tightened on each of the braking rods and, under the effect of the force of gravity, bears against the corresponding reel.

(c) *Supply tube C*.—This tube is of rigid plastic material and is held stationary in the vertical direction by a collet chuck 15 secured to the stand A by a bracket 15ª. An electrically-operated valve 16, controlled by an electromagnet 16ª, is placed on the tube C. Further, the latter carries two conductors 17 (Figs. 4 and 10) which terminate in two platinum wires 17ª. A sheath 18 of plastic material covers the tube C and the two conductors 17 but leaves uncovered only the end of the tube and the end of the platinum wires 17ª (Fig. 4) which are slightly upwardly set back relative to the bottom end of the tube C.

(d) *Upper press D* (*Figs. 2 and 5 to 7*).—It comprises a forward support 19 and a rear support 20 fixed to the stand A and interconnected by four cylindrical guides 21 on which is slidable a moving plate 22 controlled by a double-acting pneumatic ram or fluid motor 23. Fixed on the plate 22 through the medium of four insulators 25 is a pre-forming electrode 24. Disposed on the rear support 20 is the counter-electrode. The latter is formed (Figs. 5 and 6) of a body 26 provided in its middle part with a longitudinal recess 27 in which is disposed a portion of the tube C and two guides 28 and 29 each of which is fixed on the body 26 by means of two lugs 30 and knurled screws 31; these guides ensure the lateral guiding of the bands Q and R.

The electrodes 24 and 26 are supplied with high-frequency current by a conventional generator I (Fig. 2) which is connected by a coaxial cable J leading to a conventional coupling box K connected by a conductor 32 to a stud 33 (Fig. 5) supported by an insulator 34. At the end of the closure of the press D, a strip of copper 35 fixed to the movable electrode 24 comes into contact with the stud 33, the high-frequency circuit being closed by the other electrode 26 which is connected to earth.

Figure 5:
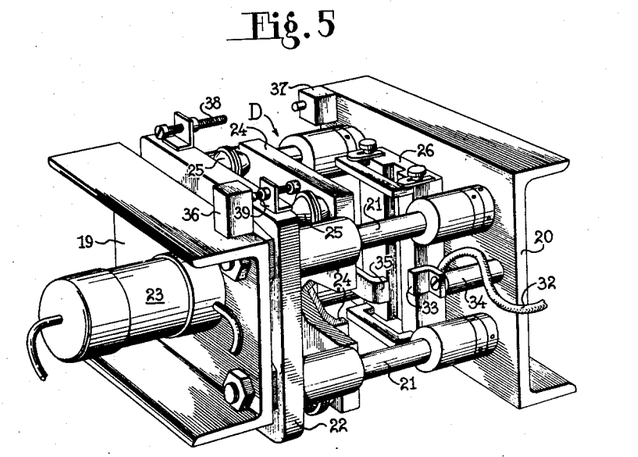
Fig. 5 is a perspective view of the first press.

The press D is completed by two switches 36 and 37 which are respectively carried by the supports 19 and 20 and co-operate with screws 38 and 39 carried by the movable part 22 of the press so that the switch 36 is closed when the press is open and the switch 37 is closed when the press is closed.

(e) *Lower press E* (*Figs. 2 and 8*).—This press comprises two supports 40 and 41 fixed to the stand A in a position which is vertically adjustable by means of screws 42 extending through elongated apertures 43 in the uprights of the stand.

Figure 8:
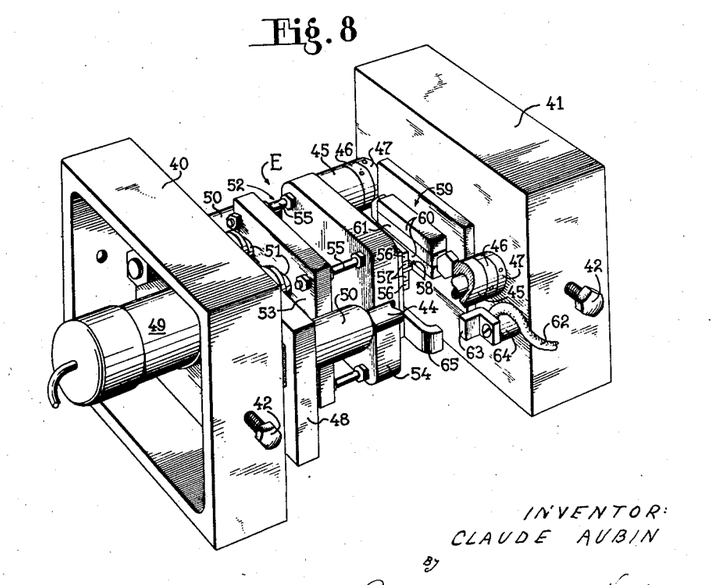
Fig. 8 is a perspective view of the second press.

These two supports are interconnected by two cylindrical guides 44. Each of these guides is screw-threaded, in its portion situated just in front of the support 41, for the purpose of adjusting on this guide an abutment sleeve 45 by means of a nut 46 and a lock-nut 47 screw-threadedly engaged on this guide.

Movable on the two guides is a plate 48 which is moved by a ram or fluid motor 49 whose cylinder is carried by the support 40. The travel of the movable plate 48 toward the rear support 41 is limited by two sleeves 50 which are rigid with this plate and abut the adjustable sleeves 45.

This plate 48 carries, through the medium of insulators 51, the movable electrode which is generally indicated by the reference numeral 52.

This electrode comprises two plates 53, 54 (Fig. 8) interconnected in an adjustable manner by spacer members 55. On its rear face, the plate 44 carries, between two bands of rubber 56, two copper plates 57 from which a small strip or blade 58 slightly protrudes.

Disposed in front of said movable electrode 52 is a fixed counter-electrode generally indicated by the reference numeral 59. This counter-electrode is fixed to the support 41 and carries two blocks of rubber 60 separated by a copper strip 61.

It will be recalled that the electrodes 52 and 59 are adapted to effect transverse welds U in the package (Fig. 1). These welds are obtained by clamping the two bands Q and R between the metal part 57 of the electrode 52 and the metal part 61 of the counter-electrode 59 while the blade 58 contributes to the welding but also produces the line of reduced resistance along which the bags obtained may be separated on the lines V—V. To this end, this blade 58 must move nearer to the strip 61 of the counter-electrode than the parts 57 and this is the reason why it protrudes from the latter. The adjustment of the extreme advanced position of the blade 58 is obtained by adjusting the sleeve 45.

The supply of high-frequency current to the lower press E is similar to that for the upper press. A generator L (Fig. 2) is provided and is connected by a cable M to a coupling box N. A conductor 62 connects this box N (Fig. 8) to a stud 63 carried by the support 41 through the medium of an insulator 64. A tongue 65 rigid with the movable electrode 62, enters into contact with the stud 63 when the clamp is in its closed position.

(f) *Clamp F* (*Fig. 2*).—It comprises a metal frame 66 on which are mounted for pivotal movement about two pivot pins 67 and 68 two jaws 69 and 70 rigid with these pins. These jaws are provided with rubber liners 71 and 72.

A pneumatic or air ram 73 controls the jaws 69 through a fork 74, a connecting rod 75 and an arm 76 keyed to the pin 67. The movement of the jaw 69 is transmitted to the jaw 70 by two toothed sectors 77 and 78.

An adjustable screw 79 fixed on the jaw 69 actuates a reversing contactor 80 having two switches 80ª, 80ᵇ (Fig. 10), the switch 80ª being closed when the clamp is closed and the switch 80ᵇ being closed when the clamp is open.

(g) *Air-liquid device G* (*Figs. 2 and 9*).—This device is adapted to move the clamp F in a longitudinal direction and in an alternating manner and comprises a single-acting air ram or fluid motor 81 whose cylinder is fixed by bases 82 and 83 to the end of a tube 84 the other end of which is fixed to the cylinder of a hydraulic ram or fluid motor 85 by other bases 86 and 87.

Figures 3, 4, 6, 7, 9:
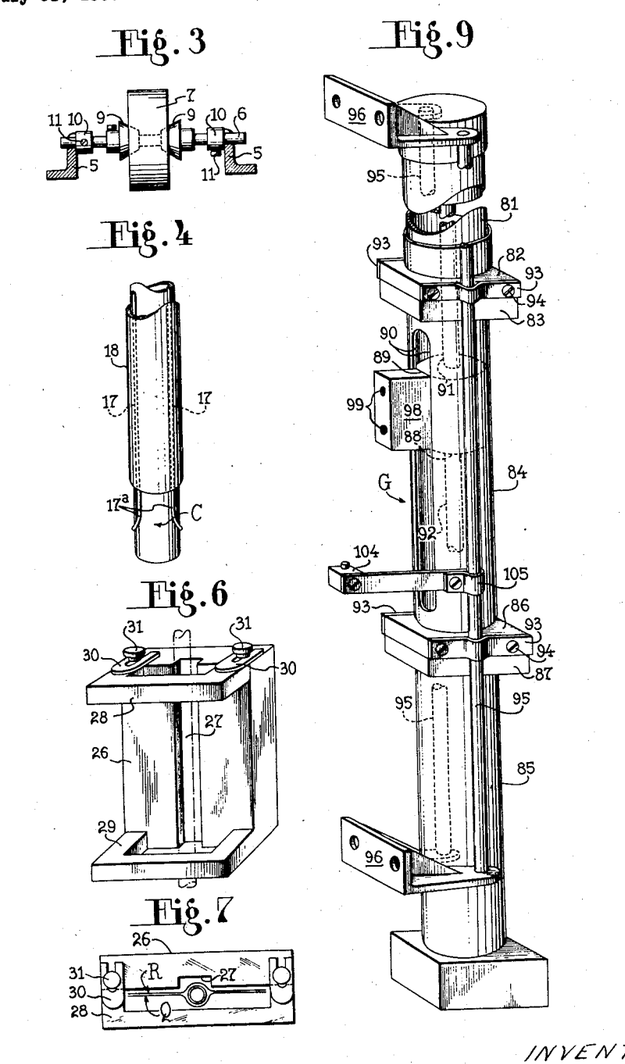
Fig. 3 is a detail view of one of the supply reels of one of the plastic bands, and the support therefor.
Fig. 4 is a perspective view of the lower portion of the supply tube supplying the product to be packed, and the associated parts.
Fig. 6 is a perspective view of the fixed electrode for the first press.
Fig. 7 is a plan view of this electrode.
Fig. 9 is a perspective view of the device causing the pulling clamp to effect longitudinal alternating movements.

Slidable inside the tube 84 is a free member 88 which is cylindrical and has a flat portion 89 in front of an opening 90 provided in the tube; the length of the opening corresponds to the maximum travel of the clamp F plus the length of the member 88.

The rods 91 and 92 of the rams 81 and 85 rest in two semi-spherical recesses formed in the upper and lower ends of the member 88.

Four flanges 93, clamped by screws 94, fix the above-described unit on two guide rods 95 which are fixed to the stand A by two members 96 bolted to the latter.

The clamp F is fixed by its support 66 and by screws 97 (Fig. 2) on the intermediate member 98 fixed to the flat portion 89 by two screws 99 (Fig. 9). This intermediate member 98, whose width is equal to the width of the opening 90, also ensures the lateral guiding of the clamp F.

Fixed at the lower part of the hydraulic ram 85 is an electrically-operated valve 100 through which the oil of the ram communicates with an oil tank 101. A pocket of air is maintained under pressure at the upper part of the tank 101 by a check valve 102 connected to a source of compressed air by a pressure gauge-relief valve 103.

Fixed on one of the rods 95 supporting the unit by a flange 105 clamped on the rod is a double contactor 104 (having two switches 104$^a$ and 104$^b$) at adjustable height. A lug 106 disposed on the clamp F acts the contactor 104 to close the two switches 104$^a$ and 104$^b$ when the clamp reaches its lowermost position.

(h) *Device H supplying fluid to the rams and automatically controlling this supply (Figs. 2 and 10).*— At the rear of the machine and fixed on the stand A, is a casing 107 containing the major part of this device, a small part being housed in a housing 108. Reference is made to the diagram shown in Fig. 10 in which reference numeral 23 indicates the air ram for closing the upper press D; 49 indicates the air ram for closing the lower press E; 73 indicates the air ram for opening and closing the jaws of the clamp F; 81 indicates the air ram forming part of the device G controlling the clamp F, this ram being provided more particularly for ensuring the downward movement of the clamp; 85 indicates the hydraulic ram for raising the clamp and holding the latter in its lowermost position.

Figure 10:
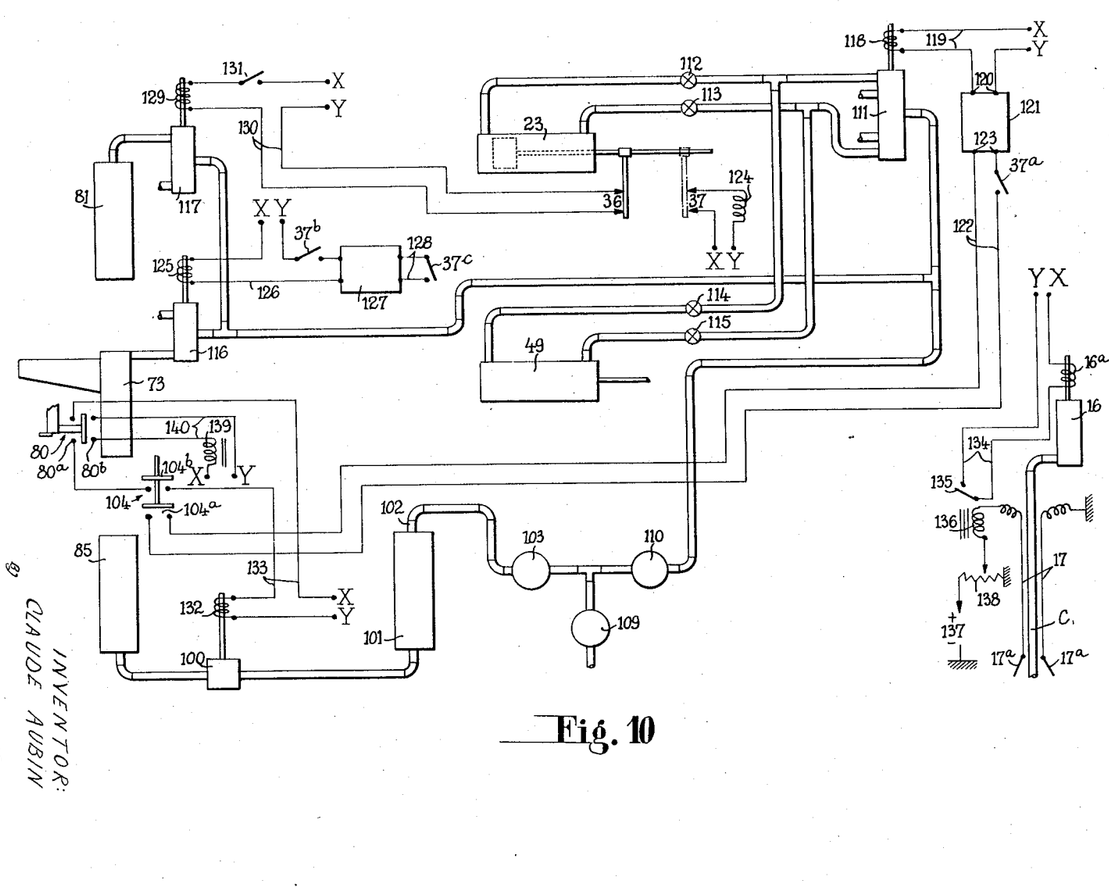
Fig. 10 is a diagram of the pneumatic and hydraulic supply circuits of the various rams of the machine, and the electrical control circuits for the electrically-operated valves controlling the supply circuit.

The supply circuits of each of these rams and their electromechanical control will now be described in turn.

The rams 23, 49, 73 and 81 are supplied with compressed air from a compressed air source 109 through a pressure gauge-relief valve 110. The double-acting rams 23 and 49 for the presses D and E are supplied through a common electrically-operated valve 111 which permits selectively putting under pressure one of the ends of the ram, the other being connected to the exhaust. The cocks 112, 113, 114, 115 regulating the supply of air are disposed between the electrically-operated valve and these rams. The single-acting ram 73 for closing the jaws of the clamp is supplied with air through an electrically-operated valve 116 which permits connecting this ram to the source 109 or to the exhaust. The single-acting ram 81 for lowering the clamp F is supplied with air through an electrically-operated valve 117 which permits connecting it to the source 109 or to the exhaust.

The single-acting hydraulic ram 85 is, as mentioned hereinbefore, fed through an electrically-operated valve 100 which receives oil under pressure from a tank 101 which encloses a pocket of air supplied with air from the source 109 through the pressure gauge-relief valve 103 and the check valve 102, which opens only in the direction from the source 109 to the air pocket of the tank 101.

The electro-mechanical controls of said valves will now be described in turn. In the diagram shown in Fig. 10, the points X and Y designate the two terminals of the supply circuit.

(a) *Electrically-operated valve 111 for the rams 23 and 49.*—The coil 118 is connected to the terminals X and Y through a circuit 119 connected to the output terminals 120 of a time relay 121 of the impulse type which is so arranged that the temporary closure of a control circuit 122, described hereinafter and connected to two input terminals 123, results in an internal impulse causing the closure inside the apparatus of the circuit 119 connected at 120, during a period of time ($t_1$) which is adjustable and starts at the moment when the impulse ceases. The control circuit 122, to provide the impulse, must be closed on itself outside the relay 121. The closure is obtained by two-series-connected switches 37$^a$ and 104$^a$.

The switch 37$^b$ is opened by the closure of the switch 37 actuated by the closure of the press D, as mentioned hereinbefore. This switch 37 controls the supply to an auxiliary relay 124 which controls, in particular, the switch 37$^a$.

The switch 104$^b$ constitutes one of the two parts of the contactor 104 and is closed by the clamp F at the end of its downward travel.

Briefly, it can be seen that the electrically-operated valve 111 is supplied with current when the clamp F reaches its lowermost position, since at this moment, as will be understood hereinafter, the press D is open, and in consequence the switch 37$^a$ closed. Supplying the valve 111 with current results in the left end of the rams 23 and 49 being put under pressure and their right ends being connected to the exhaust, thereby ensuring the closure of the presses D and E.

(b) *Electrically-operated valve 116 controlling the closure of the clamp F by supplying fluid to the ram 73.*— The coil 125 is connected to the source XY by a circuit 126 through a switch 37$^b$, controlled by the aforementioned relay 124 in such manner that it is closed when the relay is excited, and a time relay 127. This relay is also of a known type in which a control circuit 128 is maintained open by means of a switch 37$^c$ which determines the opening within the apparatus of the circuit 126 after a period of time $t_2$ which is adjustable and starts at the moment of opening the control circuit 128. The switch 37$^c$ is controlled by the relay 124 in such manner as to be opened when this relay is excited.

The electrically-operated valve 116 is arranged to put the ram 73 in communication with the exhaust when the coil 125 is excited, as mentioned hereinbefore.

(c) *Electrically-operated valve 117 of the air ram 81 for lowering the clamp.*—The coil 129 is connected to the source XY by a circuit 130 comprising a switch 131 and the switch 36 connected in series.

The switch 131 is the sole manually operated switch of the machine. This is the switch which, when closed, starts up the machine.

The switch 36 is closed by the ram 23 when the upper press D is opened. Thus this switch 36 only permits the lowering of the clamp F when the press D is opened, since the electrically operated valve is so arranged that the ram 81 is put under pressure when the coil 129 is excited.

(d) *Electrically-operated valve 100 for the hydraulic ram 85.*—Its coil 132 is connected to the source XY by a circuit 133 which comprises, connected in series, the switch 104$^b$ of the double contactor 104 and the switch 118$^a$ of the double contactor 80.

The switch 104$^b$ is closed, as is the switch 104$^a$, when the clamp reaches its lowermost position.

The switch 118$^a$ of the contactor 80 is closed when the clamp F is closed.

Thus the coil 132 is supplied with current when the clamp is at its lowermost position and is closed, and the valve 100 is so arranged that it is then closed, this valve automatically opening when the coil 132 is no longer excited.

(e) *Electrically-operated valve 16 controlling the product supply tube C.*—Its coil 16$^a$ is connected to the source XY by a circuit 134 comprising a switch 135 actuated in the direction to be opened by the excitation of the relay whose coil 136 is connected to the terminals of an electric source 137 by a potentiometer 138 and the platinum wires 17$^a$, the circuit being closed when the product to be packed forms a bridge between these two wires.

The valve 16 is so arranged that it is opened when its coil receives current, that is, when the relay is not excited, the product to be packed failing to reach the wires 17$^a$.

(f) The electromechanical unit is completed by a relay 139 adapted to apply the high tension across the generators I and L (Fig. 2). The circuit 140 of this relay is connected to the source XY through a switch 80$^b$ of the contactor 80 in such manner that the generators receive current when the switch 80ᵇ is closed, which corresponds to an open clamp F.

II. *Operation of the machine*

Figure 11:
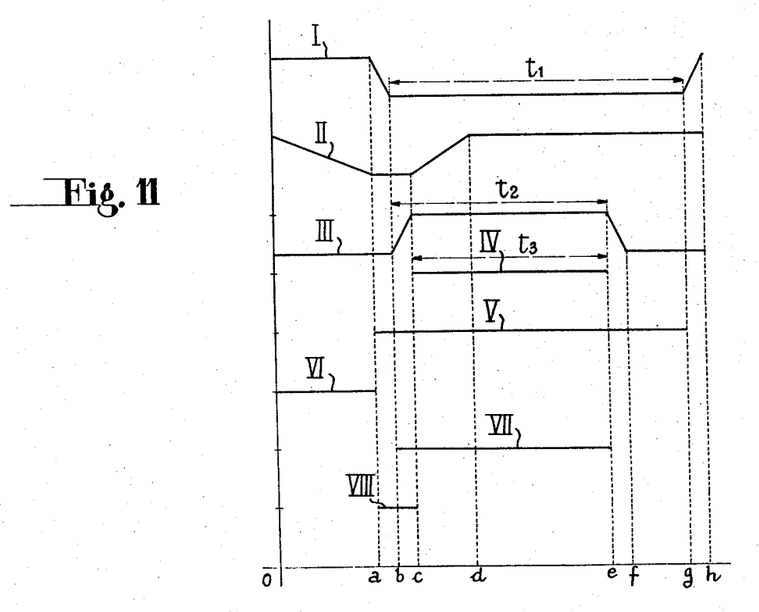
Fig. 11 is a time graph corresponding to one operational cycle of the machine.

Reference will be made to the time graph shown in Fig. 11, in which the times $a, b, c \ldots h$ of the different instants when a change occurs in a complete operational cycle of the machine are plotted along the axis $Ot$.

The line I represents the opening of the presses D and E (the upper parts of the line) and to their closure (lower parts of the lines).

Line II represents the longitudinal position of the clamp F.

Line III represents the opening (upper parts) and the closure (lower parts) of the clamp F.

Line IV represents the periods during which the generators I and L are supplied with current (welding time).

Line V represents the periods during which the rams closing the presses are fed for closing the presses.

Line VI represents the periods during which the air ram 81 is fed.

Line VII represents the periods during which the ram 73 ceases to be fed (opening of the jaws of the clamp F).

Line VIII represents the periods during which the circulation of oil is stopped between the hydraulic ram 85 and the clamp 101.

Just before the start of a cycle (time O in Fig. 11) the manual switch 131 is open. The coil 129 of the valve 170 receives no current. The ram 81 is connected to the exhaust and does not urge the clamp F downwardly, and the clamp is maintained in its upper position (line II) by the ram 85, since the valve 100 is open and the oil of the ram 85 is subjected to the pressure of the air pocket of the tank 101.

Further, this clamp F is closed (line III) since the coil 125 of the valve 116 is not excited because its supply circuit is opened at 37ᵇ.

The presses D and E are open (line I), since the coil 118 is no longer excited owing to the opening of its circuit inside the time relay 121.

The level of the product to be packed is at its highest in the container and it establishes contact between the two platinum wires 17ᵃ and this closes the supply circuit of the relay 136. As the valve (16, 16ᵃ) receives no current, supply of product ceases.

To start up the machine, the manual switch 131 is closed. The closure of the switch causes the valve 117, 129 to receive current through the switch 36, which is closed (line 6). Air is admitted into the upper part of the ram 61 which urges the clamp F downwardly.

The oil of the hydraulic ram 85 is discharged into the tank 101 through the valve 100. The pressure of the air pocket in the tank 101 increases owing to the presence of the valve 102 which prevents discharge of air into the supply circuit. This increasing pressure limits the acceleration imparted to the clamp F in its downward movement.

The clamp F descends (line 3) and pulls on the packed product until instant $a$ when it acts on the contactor 104 and closes its two switches 104ᵃ and 104ᵇ.

It will be observed that in selecting the position of the contactor 104 on the rod 95, it is possible to adjust the instant $a$ corresponding to the arrival of the clamp F at its lowermost position or, in other words, the displacement of the packed product as a function of the length of the bags P to be produced. The closure of the switch 104ᵇ excites the coil 132 of the valve 100, since the switch 104ᵃ is closed (closed clamp). Flow of oil from the ram 85 to the tank 101 is stopped and the downward movement of the clamp F ceases.

Simultaneously, closure of the switch 104ᵃ causes closure of the circuit 122 of the time relay 121 through the contactor 37ᵃ, which is closed. The circuit 119 is closed (inside the apparatus) and the coil 118 of the valve 111 is without delay supplied with current (start of the line V at instant $a$).

The valve 111 reverses the supply of air to the rams 23 and 49 and starts to close the presses D and E, which closure finishes at instant $b$.

Meanwhile, as soon as the press D starts to close at instant $a$, current supply to the coil 129 of the valve 117 is cut off by the switch 36 and the air ceases to be supplied to the ram 81, which is connected to the exhaust (end of the first portion of the line IV). The clamp F, however, remains at its lowermost position because the valve 100 is still closed. When the presses D and E reach their closed position (instant $b$) the current supply circuit for the coil of the relay 124 is closed, which causes closure of the switch 37ᵇ and opening of the switches 37ᵃ and 37ᶜ.

The opening of the switch 37ᵃ terminates the impulse period controlling the time relay 121. The output circuit 119 remains closed inside the apparatus during a period $t_1$ (from $b$ to $g$). During this period $t_1$:

(a) The presses D and E remain closed.

(b) Closure of the switch 137ᵇ supplies the coil 125 of the valve 116 with current through the output circuit 126 of the time relay 127; simultaneously, the control circuit 128 of this relay is open exteriorly by the opening of the switch 37ᶜ; the circuit 126 remains closed inside the apparatus during a period $t_2$ starting at the opening of the switch 37ᶜ, that is, at the instant $b$ and continuing until instant $e$.

Supplying the coil 125 with current stops the supply of air to the ram 73 which maintains the jaws of the clamp F closed; the latter are opened during the period from instant $b$ to instant $c$, line III) and actuate the reversing switch 80.

(c) The switch 80ᵃ is opened and cuts off the supply to the coil 132 of the valve 100 which once more allows the oil from the tank 101 to flow to the ram 85, which urges the open clamp F upwardly where it resumes its initial position, from instant $c$ to instant $d$ (line II).

(d) Meanwhile, the switch 80ᵇ is closed which causes the coil 139 to receive current and the generators I and L are supplied with high-tension power (instant $c$ line IV); the period $t_3$ of welding (from $d$ to $e$) is therefore controlled by the opening of the jaws of the clamp, since this opening controls the closing of the switch 80ᵇ.

(e) At the end of the period $t_2$ at instant $e$, the jaws of the clamp F are closed (line III) between the instants $e$ and $f$ the welding ceases (line IV), the welded material remaining under pressure during the period $e$—$g$ which permits it to solidify.

At the end of the period $t_2$ at instant $b$, the circuit 119 opens inside the relay 121 and the valve 111 once more reverses the supply of air to the rams 23 and 49 and causes opening of the presses D and E between the instants $g$ and $h$, $h$ corresponds to the end of the cycle.

A further cycle recommences when the press D assumes its open position, which closes the switch 36 and once more supplies current to the coil 129 of the valve 117. The level of the product to be packed varies in accordance with the ratio between the speed at which the clamp F descends and the rate of flow of the product from the supply tube C.

To obtain "inflated" doses, that is, doses which cause the walls of the bag to be put under tension by the product, it is necessary that the jaws of the clamp F close on this product, that is, that the level of the latter be higher than the level of the jaws in the uppermost position of the clamp. The weight alone of the product is not sufficient to bring about this tension. If, on the other hand, the jaws of the clamp are situated below the level of the product, these jaws, when they are clamped together, temporarily close the container above the electrodes of the lower press E and the volume of the product pushed aside by the electrodes of the press E when this press is closed creates the necessary pressure for putting the container under tension, since all the space situated below the clamp is filled and the product cannot flow upwardly owing to the closed clamp. The excess volume pushed aside by the electrodes could, moreover, be adjusted by suitably choosing the thickness of the strips 56 and 60 (Fig. 2) which in addition protect the portion of the container in the course of welding against any mechanical stress which could cause rupture of the bands.

Maintenance of the level of the product above the lowermost position of the clamp F is obtained by the combined effect of an excess supply through the tube C and a limitation of the level by the stoppage of the supply.

These stoppages are obtained by closing the valve 16 when the level of the product reaches the platinum wires 17ª. Thus it is sufficient that these wires be situated at a level higher than the uppermost position of the clamp F and that their position be adjustable by sliding the tube C in the collet chuck 15.

The potentiometer 138 permits adjusting the threshold of responsiveness of the device cutting off the supply of product in accordance with the resistivity of the product, so as to prevent premature closure of the valve 16 due to the action of foam or a thin film of product remaining on the tube C.

To obtain "soft" doses without internal pressure, it is easy to adjust the supply from the tube C in such manner that the level of the product remains lower than the level of the electrodes of the closing press E.

It will be observed that it is also possible to obtain doses without internal pressure, while allowing the automatic level adjusting device to operate, by forming in the liner blocks 71, 72 of the jaws of the clamp F recesses which permit the volume of the product pushed aside by the electrodes of the press E to rise up in the container.

Preferably, the bead-like filled container or packed product issues from the machine at Z (Fig. 2) horizontally in passing round a pulley 141.

Although a specific embodiment of the invention has been described, many modifications and changes may be made therein without departing from the scope of the invention as defined in the appended claims.

Thus, the machine could be arranged to form a plurality of bags or pockets simultaneously. This machine could comprise in side by side relation a plurality of units, similar to that described, which permit a simultaneous treatment of either a plurality of pairs of independent bands or a single pair of larger bands capable of forming containers for all the units. In the latter case, these units must be separated such distance as to prevent the flattening of the containers due to the lower closing presses from interfering with each other owing to the transverse elongation of the container upon welding. The machine could in addition, or alternatively, comprise in the unit or each unit an upper press which covers or embraces in the vertical direction a plurality of pockets, and a lower press having a plurality of sets of electrodes or other welding members. In this case it could be advantageous that the pairs of electrodes bear on the bands in succession, for example starting with the middle pair, so as to equalize the pressures. This result could be obtained in mounting the pairs of electrodes in such manner as to be capable of effecting an inoperative travel on their supports similar to the plates 54 and 59 of the press E (Fig. 5).

The welding, instead of being effected by means of a high-frequency current, could be effected by any other method of locally heating the bands, for example by heating the pressing members by means of electrical resistances disposed in these members, or by impulse heating utilizing a heating element having a low thermal inertia interposed between the bands and the pressure-applying members.

If desired, one of the bands could comprise inscriptions which appear on the finished bags, and the unwinding of these bands could be controlled, in the known manner, by a photoelectric cell which would ensure that the inscriptions are centered on the bags.

Having now described my invention what I claim as new and desire to secure by Letters Patent is:

1. Automatic machine for packing a product, which latter is of such type that it can assume the shape of the container receiving it, in the form of doses each of which is constituted by a certain quantity of said product hermetically sealed in a bag composed of two bands of plastic material joined together by welding, said machine comprising a stand and, disposed on said stand: a vertical longitudinal axial supply tube for supplying the product to be packed, said tube being open at its lower end for the outlet of said product, a feed device for continuously feeding said two bands on both sides of said tube, a first welding press for longitudinally joining together said two bands on both sides of said tube and forming at least one pocket, the successive pockets thus formed communicating with one another on the axis of said bands, a second press for sealing said pockets filled with said product along transverse weld lines, a pulling clamp separate from each of said presses and to which is imparted opening and closing movements and a longitudinal alternating vertical movement relative to said presses and parallel with said bands between an upper position and lower position for feeding the latter intermittently downwardly a distance corresponding to the length of said bands welded by said first press in the course of one of the closures of the latter, a closing device on said supply tube for controlling the level of said product to be packed between said bands relative to said upper position of said clamp, and devices for actuating in synchronism said two presses and said clamp, whereby said clamp pulls on said bands downwardly when said two presses are open.

2. Machine as claimed in claim 1, wherein said closing device of said tube comprises an electrically-operated valve placed on said tube for closing the latter and a supply circuit for said electrically-operated valve, said circuit comprising a break in the circuit slightly upwardly offset relative to the bottom end of said tube and comprising two conductive members disposed between said tube and said bands, the closure of said break being obtained through the medium of said product in such manner that the level of said product is maintained between said bands by said electrically-operated valve at the level of said conductive members.

3. Machine as claimed in claim 2, wherein, for obtaining "inflated" doses, said conductive members are situated above the plane in which said clamp closes when the latter is in said upper position.

4. Automatic machine for packing a product, which latter is of such type that it can assume the shape of the container receiving it, in the form of doses each of which is constituted by a certain quantity of said product hermetically sealed in a bag composed of two bands of plastic material joined together by welding, said machine comprising a stand and, disposed on said stand: a longitudinal axial supply tube for supplying the product to be packed, a feed device for continuously feeding said two bands on both sides of said tube, a first welding press for longitudinally joining together said two bands on both sides of said tube and forming at least one pocket, the successive pockets thus formed communicating with one another on the axis of said bands, a second press for sealing said pockets filled with said product along transverse weld lines, a pulling clamp separate from each of said presses and to which is imparted opening and closing movements and a longitudinal alternating movement relative to said presses and parallel with said bands for feeding the latter intermittently a distance corresponding to the length of said bands welded by said first press in the course of one of the closures of the latter, and devices for actuating in synchronism said two presses and said clamp, whereby, on the one hand, said clamp pulls on said bands when said two presses are open, and, on the other hand, said clamp is held closed when said second press is closed so as to prevent an upward flow of a part of said product contained in the last of said pockets formed between said two bands and allow a pressure to be exerted on said product by said second press.

5. Automatic machine for packing a product, which latter is of such type that it can assume the shape of the container receiving it, in the form of doses each of which is constituted by a certain quantity of said product hermetically sealed in a bag composed of two bands of plastic material joined together by welding, said machine comprising a stand and, disposed on said stand: a longitudinal axial supply tube for supplying the product to be packed, a feed device for continuously feeding said two bands on both sides of said tube, a first welding press for longitudinally joining together said two bands on both sides of said tube and forming at least one pocket, the successive pockets thus formed communicating with one another on the axis of said bands, a second press for sealing said pockets filled with said product along transverse weld lines, said second press being adjustable in position relative to said first press in accordance with the dimensions of said bags to be obtained, a pulling clamp to which is imparted opening and closing movements and a longitudinal alternating movement parallel with said bands for feeding the latter intermittently a distance corresponding to the length of said bands welded by said first press in the course of one of the closures of the latter, and devices for actuating in synchronism said two presses and said clamp, whereby said clamp pulls on said bands when said two presses are open.

6. Automatic machine for packing a product, which latter is of such type that it can assume the shape of the container receiving it, in the form of doses each of which is constituted by a certain quantity of said product hermetically sealed in a bag composed of two bands of plastic material joined together by welding, said machine comprising a stand and, disposed on said stand: a longitudinal axial vertical supply tube for supplying the product to be packed, a feed device for continuously feeding said two bands on both sides of said tube, a first welding press for longitudinally joining together said two bands on both sides of said tube and forming at least one pocket, the successive pockets thus formed communicating with one another on the axis of said bands, a second press for sealing said pockets filled with said product along transverse weld lines, a pulling clamp separate from each of said presses and to which is imparted opening and closing movements and a longitudinal vertical alternating movement relative to said presses and parallel with said bands for lowering the latter intermittently a distance corresponding to the length of said bands welded by said first press in the course of one of the closures of the latter, said clamp comprising a support movable along said stand, two jaws pivotably mounted on said support, a set of gears operatively inter-connecting said jaws so that the latter pivot in synchronism and to equal extents, a first control device for pivoting said jaws and a second control device for vertically moving said support and in consequence said jaws in translation between an extreme upper position and an extreme lower position, and devices for actuating in synchronism said two presses and said clamp, whereby said clamp pulls on said bands when said two presses are open.

7. Machine as claimed in claim 6, wherein said second control device for said clamp comprises a slide movable along said stand and to which is connected said support for said clamp, and an upper fluid motor and a lower fluid motor the rods of which fluid motors are connected to said slide.

8. Machine as claimed in claim 7, wherein said lower fluid motor is a hydraulic fluid motor so as to ensure a definite stoppage of said clamp at its extreme lower position.

9. Automatic machine for packing a product, which latter is of such type that it can assume the shape of the container receiving it, in the form of doses each of which is constituted by a certain quantity of said product hermetically sealed in a bag composed of two bands of plastic material joined together by welding, asid machine comprising a stand and, disposed on said stand: a longitudinal axial supply tube for supplying the product to be packed, a feed device for continuously feeding said two bands on both sides of said tube, a first welding press for longitudinally joining together said two bands on both sides of said tube and forming at least one pocket, the successive pockets thus formed communicating with one another on the axis of said bands, a second press for sealing said pockets filled with said product along transverse weld lines, a pulling clamp separate from and interposed between said presses and longitudinally spaced from the latter and to which clamp are imparted opening and closing movements and a longitudinal alternating movement relative to said presses and parallel with said bands for feeding the latter intermittently a distance corresponding to the length of said bands welded by said first press in the course of one of the closures of the latter, and devices for actuating in synchronism said two presses and said clamp, whereby said clamp pulls on said bands when said two presses are open.

10. Automatic machine for packing a product, which latter is of such type that it can assume the shape of the container receiving it, in the form of doses each of which is constituted by a certain quantity of said product hermetically sealed in a bag composed of two bands of plastic material joined together by welding, said machine comprising a stand and, disposed on said stand: a longitudinal axial supply tube for supplying the product to be packed, a feed device for continuously feeding said two bands on both sides of said tube, a first welding press for longitudinally joining together said two bands on both sides of said tube and forming at least one pocket, the successive pockets thus formed communicating with one another on the axis of said bands, a second press for sealing said pockets filled said product along transverse weld lines, a pulling clamp to which are imparted opening and closing movements and a longitudinal alternating movement parallel with said bands for feeding the latter intermittently a distance corresponding to the length of said bands welded by said first press in the course of one of the closures of the latter, devices for actuating in synchronism said two presses and said clamp, whereby said clamp pulls on said bands when said two presses are open, and a collet chuck fixed on said stand, said tube being adjustable axially by sliding in said chuck, the latter gripping said tube and holding it in position after adjustment.

References Cited in the file of this patent
UNITED STATES PATENTS

| | | |
|---|---|---|
| 2,113,636 | Vogt | Apr. 12, 1938 |
| 2,350,930 | Salfisberg | June 6, 1944 |
| 2,387,812 | Sonneborn et al. | Oct. 30, 1945 |
| 2,419,982 | Zwoyer | May 6, 1947 |
| 2,549,327 | Moule | Apr. 17, 1951 |
| 2,753,671 | De Puy et al. | July 10, 1956 |